United States Patent
Liu (10) Patent No.: US 12,495,365 B2
(45) Date of Patent: Dec. 9, 2025

(54) ELECTRONIC DEVICES WITH DUAL TRACK DYNAMIC VOLTAGE AND FREQUENCY MANAGEMENT

(71) Applicant: Apple Inc., Cupertino, CA (US)

(72) Inventor: Jia Liu, Munich (DE)

(73) Assignee: Apple Inc., Cupertino, CA (US)

( * ) Notice: Subject to any disclaimer, the term of this patent is extended or adjusted under 35 U.S.C. 154(b) by 412 days.

(21) Appl. No.: 18/157,651

(22) Filed: Jan. 20, 2023

(65) Prior Publication Data

US 2024/0251357 A1 Jul. 25, 2024

(51) Int. Cl.
*H04W 52/14* (2009.01)
*H04W 52/34* (2009.01)

(52) U.S. Cl.
CPC ......... *H04W 52/146* (2013.01); *H04W 52/34* (2013.01)

(58) Field of Classification Search
CPC .... H04W 52/14; H04W 52/146; H04W 52/34
See application file for complete search history.

(56) References Cited

U.S. PATENT DOCUMENTS

| | | | | |
|---|---|---|---|---|
| 6,548,977 B2* | 4/2003 | Vu | ............................ | G01D 3/08 388/901 |
| 6,947,854 B2* | 9/2005 | Swarztrauber | ............ | H04Q 9/00 702/80 |
| 7,111,179 B1* | 9/2006 | Girson | ..................... | G06F 1/324 713/320 |
| 8,296,773 B2* | 10/2012 | Bose | ...................... | G06F 1/3203 713/300 |
| 11,363,466 B2* | 6/2022 | Khalid | .................. | H04B 7/0608 |
| 11,943,632 B2* | 3/2024 | Khalid | .................. | H04W 16/28 |
| 2007/0139014 A1* | 6/2007 | Girson | ..................... | G06F 1/324 320/132 |
| 2008/0297133 A1 | 12/2008 | Duan et al. | | |
| 2009/0290625 A1 | 11/2009 | Riddle et al. | | |
| 2009/0328055 A1* | 12/2009 | Bose | ........................ | G06F 1/329 718/105 |
| 2013/0325378 A1* | 12/2013 | Allen-Ware | ............ | G06F 1/329 702/61 |
| 2014/0301259 A1 | 10/2014 | Homchaudhuri et al. | | |
| 2015/0242906 A1* | 8/2015 | Liu | ..................... | G06Q 30/0255 705/14.71 |

(Continued)

FOREIGN PATENT DOCUMENTS

EP     2251975 A1    11/2010

*Primary Examiner* — Hai V Nguyen
(74) *Attorney, Agent, or Firm* — Treyz Law Group, P.C.; Michael H. Lyons (57) ABSTRACT

An electronic device may include wireless circuitry having a modem that conveys data over a data path and that is operable using a dynamic voltage and frequency management (DVFM) profile. A resource and state manager (RSM) may adjust the DVFM profile based on L1, L2, L3, and/or IPC parameters. A routine track may generate a first profile based on an L1 parameter such as DL MAC TB size and may generate a second profile based on an L2 parameter such as UL pre-build size. A protective track may independently generate a third profile based on a performance event along the data path. The RSM may aggregate the preferred profiles to update the current DVFM profile in a manner that optimizes efficiency while ensuring that a sufficiently high DVFM profile is used at any given time without consuming unnecessary power.

20 Claims, 5 Drawing Sheets

(56) References Cited

U.S. PATENT DOCUMENTS

| | | | |
|---|---|---|---|
| 2019/0163250 A1* | 5/2019 | Lee | G06F 11/3062 |
| 2020/0171494 A1* | 6/2020 | Du | G01N 33/4915 |
| 2021/0227396 A1* | 7/2021 | Khalid | H04W 16/28 |
| 2022/0141750 A1* | 5/2022 | Liu | H04W 36/08 |
| | | | 455/437 |

* cited by examiner

ELECTRONIC DEVICES WITH DUAL TRACK DYNAMIC VOLTAGE AND FREQUENCY MANAGEMENT

FIELD

This disclosure relates generally to electronic devices and, more particularly, to electronic devices with wireless communications circuitry.

BACKGROUND

Electronic devices are often provided with wireless communications capabilities. An electronic device with wireless communications capabilities has wireless communications circuitry with one or more antennas.

It is challenging to form satisfactory wireless communications circuitry in an electronic device. If care is not taken, the wireless communications circuitry can consume excessive resources or can exhibit insufficient levels of wireless performance.

SUMMARY

An electronic device may include wireless circuitry for performing wireless communications. The wireless circuitry may include a modem. The modem may convey wireless data over a data path. The modem may be operable using a set of dynamic voltage and frequency management (DVFM) profiles.

The modem may include a resource and state manager (RSM) that selects the DVFM profile for the modem at any given time. The modem may adjust the DVFM profile based on Layer 1 (L1) parameters of the data path, Layer 2 (L2) parameters of the data path, Layer 3 (L3) parameters of the data path, and/or inter-processor communications (IPC) parameters of the modem. The modem may select an optimal DVFM profile based on the current uplink (UL) and downlink (DL) needs of the data path and based on performance events that may occur along the data path.

For example, the modem may include a routine processing track that generates or votes for a first preferred DVFM profile based on an L1 parameter such as DL media access control (MAC) transport block (TB) size. The routine processing track may also generate or vote for a second preferred DVFM profile based on an L2 parameter such as UL pre-build size. The modem may include a protective processing track that independently generates or votes for a third preferred DVFM profile based on the occurrence of an L1, L2, L3, and/or IPC performance event along the data path. The performance event may be associated with the depletion of a hardware resource along the data path, for example. The modem may include an aggregator that aggregates the first, second, and third preferred DVFM profiles and that updates the current DVFM profile of the modem based on the aggregation. This may optimize the efficiency of DVFM profile selection while ensuring that a sufficiently high DVFM profile is used at any given time without consuming an unnecessary amount of power.

An aspect of the disclosure provides a method of operating an electronic device. The method can include transmitting wireless data using a modem communicably coupled to one or more antennas. The method can include adjusting a power supply voltage of the modem based on an uplink (UL) pre-build size of the wireless data.

An aspect of the disclosure provides a method of operating an electronic device. The method can include receiving wireless data using a data path of a modem communicably coupled to one or more antennas. The method can include adjusting a power supply voltage of the modem based on a Layer 3 (L3) parameter of the data path associated with receiving the wireless data.

An aspect of the disclosure provides an electronic device. The electronic device can include one or more antennas. The electronic device can include a modem communicably coupled to the one or more antennas and configured to convey radio-frequency signals using a power supply voltage and an operating frequency. The electronic device can include one or more processors configured to interface with the modem over a link characterized by an inter-processor communication (IPC) parameter, the modem being configured to adjust the power supply voltage and the operating frequency based on the IPC parameter.

DETAILED DESCRIPTION

Figure 1:
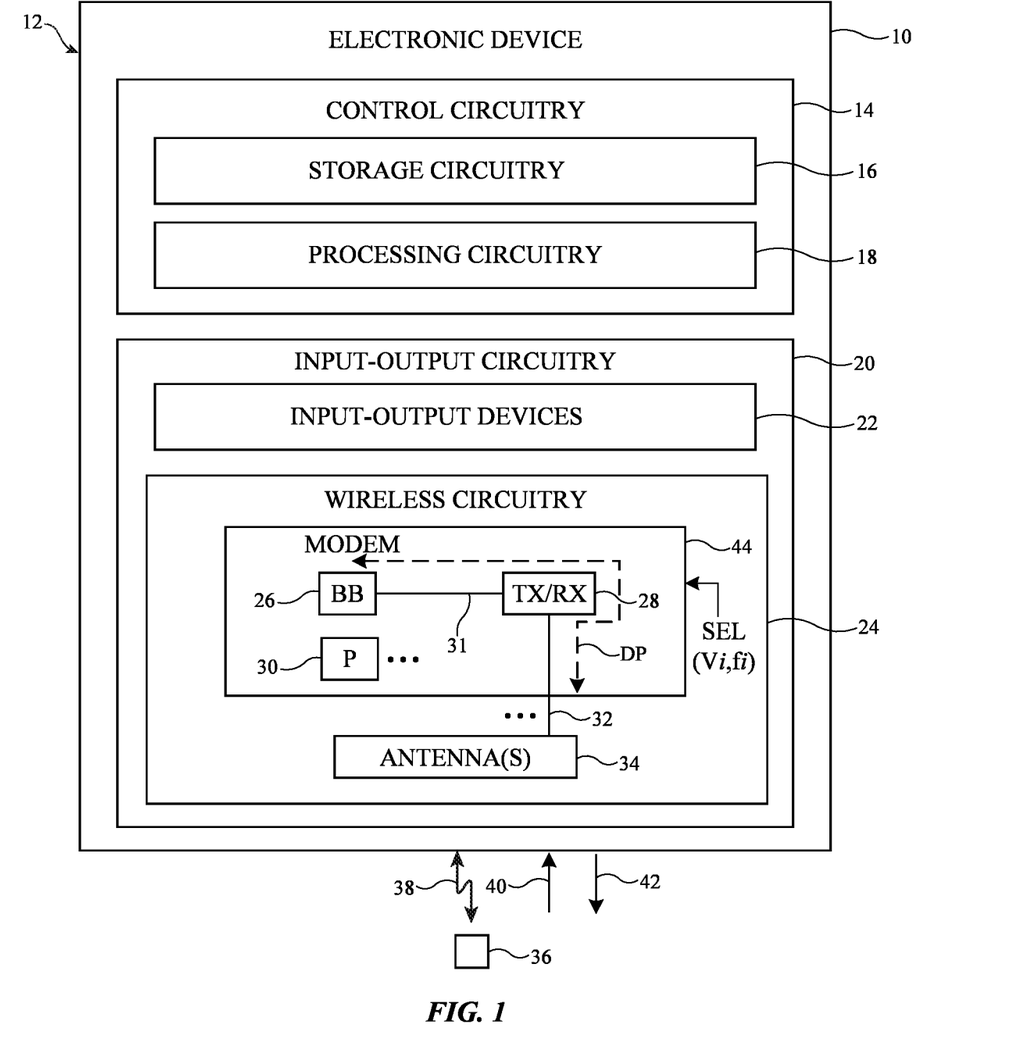
FIG. 1 is a schematic diagram of an illustrative electronic device having wireless circuitry with a modem that operates using different dynamic frequency and voltage management (DVFM) profiles in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment. Device 10 may be operated by an end user and may sometimes be referred to herein as user equipment (UE) device 10.

As shown in the schematic diagram FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols-sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays, light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more modems 44 and one or more antennas 34. Modem 44 (sometimes referred to herein as radio 44) may be implemented on a corresponding integrated circuit (IC) chip and may sometimes be referred to herein as a modem chip or radio chip. In other implementations, the components of modem 44 may be distributed across multiple integrated circuit chips (e.g., in one or more IC packages).

Modem 44 may include baseband circuitry such as baseband (BB) circuitry 26 (e.g., one or more baseband processors and/or other circuitry that operates at baseband), radio-frequency (RF) transceiver (TX/RX) circuitry such as one or more transceivers 28, and one or more processors 30. Transceiver 28 may be coupled to antenna(s) 34 over one or more radio-frequency transmission line paths 32. If desired, radio-frequency front end circuitry (not shown) may be disposed on radio-frequency transmission line path(s) 32 within modem 44 and/or external to modem 44 (e.g., in one or more front end modules). Baseband circuitry 26 may be coupled to transceiver 28 over one or more baseband signal paths 31. Baseband circuitry 26 may include, for example, modulators (encoders) and demodulators (decoders) that operate on baseband signals. Processors 30 may control the operations of modem 44 in transmitting, receiving, and processing signals that convey wireless data. Processors 30 may include one or more CPUs, microprocessors, or other processors, as examples.

The portion of baseband circuitry 26 associated with transmitting baseband signals to transceiver 28 and receiving baseband signals from transceiver 28 (e.g., a baseband signal path within baseband circuitry 26 and the corresponding circuitry disposed thereon such as modulation circuitry and/or demodulation circuitry), baseband signal path 31, the portion of transceiver 28 associated with transmitting or receiving radio-frequency signals over antenna(s) 34 (e.g., a baseband signal path and/or radio-frequency signal path within transceiver 28 and the corresponding circuitry disposed thereon), and the portion of radio-frequency signal path 32 within modem 44 may sometimes be referred to herein collectively as the data path or data plane DP of modem 44. Data path DP may also include software and/or firmware executed by one or more components of modem 44 (e.g., one or more processors 30) in transmitting and/or receiving signals over antenna(s) 34.

During, prior to, and/or after performing wireless communications (e.g., transmitting and/or receiving wireless data using radio-frequency signals), the circuitry disposed on or supporting data path DP may generate data path parameters associated with the transmitted and/or received signals. The data path parameters may include Layer 1 (L1) parameters (e.g., parameters of the physical layer of the Open Systems Interconnection (OSI) model), Layer 2 (L2) parameters (e.g., parameters of the data link layer of the OSI model), Layer 3 (L3) parameters (e.g., parameters of the network layer of the OSI model), inter-processor communication (IPC) parameters (e.g., parameters associated with a communication over a communications link between modem 44 and the application processor (AP) running on control circuitry 14 external to modem 44), etc.

In the example of FIG. 1, wireless circuitry 24 is illustrated as including only a single modem 44, a single transceiver 28, and a single radio-frequency transmission line path 32 for the sake of clarity. In general, wireless circuitry 24 may include any desired number of modems 44, any desired number of transceivers 28, any desired number of radio-frequency transmission line paths 32, and any desired number of antennas 34. If desired, each modem 44 in wireless circuitry 24 may include circuitry that implements a corresponding radio access technology (RAT) (e.g., wireless circuitry 24 may include a cellular modem 44, a wireless local area network modem 44, etc.). If desired, a single modem 44 may implement multiple cellular RATs (e.g., a 4G RAT and a 5G RAT).

Radio-frequency transmission line path 32 may be coupled to one or more antenna feeds on one or more antennas 34. Each antenna feed may for example, include a positive antenna feed terminal and a ground antenna feed terminal. Radio-frequency transmission line path 32 may have a positive transmission line signal path that is coupled to the positive antenna feed terminal and may have a ground transmission line signal path that is coupled to the ground antenna feed terminal. This example is illustrative and, in general, antennas 34 may be fed using any desired antenna feeding scheme.

Radio-frequency transmission line path 32 may include transmission lines that are used to route radio-frequency antenna signals (wireless signals) within device 10. Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 32 may be integrated into rigid and/or flexible printed circuit boards. In one embodiment, radio-frequency transmission line paths such as radio-frequency transmission line path 32 may also include transmission line conductors integrated within multilayer laminated structures (e.g., layers of a conductive material such as copper and a dielectric material such as a resin that are laminated together without intervening adhesive). The multilayer laminated structures may if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

In performing wireless transmission, modem 44 may transmit signals to antenna(s) 34 over data path DP. Baseband circuitry 26 may provide baseband signals to transceiver 28 over baseband signal path 31. Transceiver 28 (e.g., one or more transmitters in transceiver 28) may include circuitry for converting the baseband signals received from baseband circuitry 26 into corresponding radio-frequency signals 38. For example, transceiver 28 may include mixer circuitry that up-converts the baseband signals to radio frequencies prior to transmission over antennas 34. Transceiver 28 may also include digital to analog converter (DAC) and/or analog to digital converter (ADC) circuitry that convert signals between digital and analog domains. Transceiver 28 may transmit radio-frequency signals 38 over antennas 34 via radio-frequency transmission line path 32. Antennas 34 may transmit radio-frequency signals 38 to external wireless equipment 36 by radiating the radio-frequency signals into free space (e.g., as uplink (UL) signals transmitted in UL direction 42).

External wireless equipment 36 may include a wireless base station (gNB), a wireless access point, or another device such as device 10, as examples. An implementation in which wireless equipment 36 is a wireless base station of a communications network is described herein as an example. The base station may be operated as a part of the communications network (e.g., a cellular telephone network) that is operated by a corresponding network service provider or carrier. The base station and the other network nodes of the communications network (e.g., as operated by the network service provider rather than an end user of a UE device such as device 10) may sometimes be referred to herein simply as the network.

In performing wireless reception, antennas 34 may receive radio-frequency signals 38 from external wireless equipment 36 (e.g., as downlink (DL) signals transmitted in DL direction 40). Modem 44 may receive the radio-frequency signals from antenna(s) 34. The received radio-frequency signals may be conveyed to transceiver 28 via radio-frequency transmission line path 32. Transceiver 28 may include circuitry that converts the received radio-frequency signals into corresponding baseband signals. For example, transceiver 28 may include one or more receivers having mixer circuitry that down-converts the received radio-frequency signals to baseband frequencies prior to conveying the baseband signals to baseband circuitry 26 via baseband signal path 31.

While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, processors 30 of modem 44 may sometimes be referred to herein as forming a part of the control circuitry 14 of device 10 (e.g., as part of one or more processors in the processing circuitry 18 implemented on device 10).

Wireless circuitry 24 may transmit and/or receive wireless signals within corresponding frequency bands of the electromagnetic spectrum (sometimes referred to herein as communications bands or simply as "bands"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-100 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Antennas 34 may be formed using any desired antenna structures. For example, antennas 34 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Parasitic elements may be included in antennas 34 to adjust antenna performance. If desired, wireless circuitry 24 may include multiple antennas 34 that are arranged into a phased antenna array (sometimes referred to as a phased array antenna) that conveys radio-frequency signals within a corresponding signal beam that can be steered in different directions.

Filter circuitry, switching circuitry, impedance matching circuitry, and other circuitry may be interposed within radio-frequency transmission line path 32, may be incorporated into front end circuitry, and/or may be incorporated into antennas 34 (e.g., to support antenna tuning, to support operation in desired frequency bands, etc.). These components, sometimes referred to herein as antenna tuning components, may be adjusted (e.g., using control circuitry 14) to adjust the frequency response and wireless performance of antennas 34 over time.

In general, transceiver 28 may cover (handle) any suitable communications (frequency) bands of interest. The transceiver may convey radio-frequency signals using antennas 34 (e.g., antennas 34 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 34 may transmit the radio-frequency signals by radiating the radio-frequency signals into free space (or to free space through intervening device structures such as a dielectric cover layer). Antennas 34 may additionally or alternatively receive the radio-frequency signals from free space (e.g., through intervening devices structures such as a dielectric cover layer). The transmission and reception of radio-frequency signals by antennas 34 each involve the excitation or resonance of antenna currents on an antenna resonating element in the antenna by the radio-frequency signals within the frequency band(s) of operation of the antennas.

In example where multiple antennas 34 are arranged in a phased antenna array, each antenna 34 may form a respective antenna element of the phased antenna array. Conveying radio-frequency signals using the phased antenna array may allow for greater peak signal gain relative to scenarios where individual antennas 34 are used to convey radio-frequency signals. In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. In scenarios where millimeter or centimeter wave frequencies are used to convey radio-frequency signals, a phased antenna array may convey radio-frequency signals over short distances that travel over a line-of-sight path. To enhance signal reception for millimeter and centimeter wave communications, the phased antenna array may convey radio-frequency signals using beam steering techniques (e.g., schemes in which antenna signal phase and/or magnitude for each antenna in an array are adjusted to perform beam steering).

For example, each antenna 34 in the phased antenna array may be coupled to a corresponding phase and magnitude controller in front end circuitry 30. The phase and magnitude controllers may adjust the relative phases and/or magnitudes of the radio-frequency signals that are conveyed by each of the antennas 34 in the phased antenna array. The wireless signals that are transmitted or received by the phased antenna array in a particular direction may collectively form a corresponding signal beam. The signal beam may exhibit a peak gain that is oriented in a particular pointing direction at a corresponding pointing angle (e.g., based on constructive and destructive interference from the combination of signals from each antenna in the phased antenna array). Control circuitry 14 may adjust the phase and magnitude controllers to change the direction of the signal beam over time (e.g., to allow device 10 to continue to communicate with external equipment even if the external equipment moves relative to device 10 over time). This example is merely illustrative and, in general, antennas 34 need not be arranged in a phased antenna array.

Modem 44 may be powered using a set of different power supply voltages (PSVs) Vi and may perform processing operations using a set of different operating frequencies fi. Power supply voltages Vi may be provided by power supply circuitry in device 10 (e.g., as powered through a power adapter and/or battery). Frequencies fi may be oscillation (clocking) frequencies used by modem 44 (e.g., processors 30) in conveying signals over data path DP. In general, higher power supply voltages Vi may support higher frequencies fi and higher data rates for transmitting/receiving signals, whereas lower power supply voltages Vi may support lower frequencies fi and lower data rates.

In practice, modem 44 may operate at different loads (e.g., higher loads when data needs to be conveyed at higher data rates and lower loads when data needs to be conveyed at lower data rates). As such, modem 44 may need to dynamically adjust its power supply voltage Vi and/or its frequency fi based on its current data transfer needs. For example, modem 44 may need to increase its power supply voltage Vi and/or its frequency fi to prevent data stall when modem 44 conveys signals at a relatively high data rate. On the other hand, modem 44 may need to decrease its power supply voltage Vi and/or its frequency fi to prevent unnecessary energy waste when modem 44 conveys signals at a relatively low data rate, thereby reducing overall power consumption by device 10 and preserving battery charge.

Modem 44 may convey wireless signals using a selected DVFM profile (state) from a set of DVFM profiles (states)

supported by the modem. Each DVFM profile (sometimes referred to herein as power profiles, DVFM power profiles, or DVFM states) may include a corresponding power supply voltage Vi and a corresponding frequency fi to be used by modem 44 when operating using (under) that DVFM profile. As one example, modem 44 may operate using a set of three DVFM profiles: a High DVFM profile having a relatively high power supply voltage VH (e.g., 0.9V) and frequency fH (e.g., 1000 MHz), a Medium DVFM profile having a moderate power supply voltage VM (e.g., 0.75V) that is less than VH and frequency fM (e.g., 700 MHz) that is less than FH, and a Low DVFM profile having a low power supply voltage VL (e.g., 0.6V) that is less than VM and frequency fL (e.g., 400 MHz) that is less than fM. The High profile may configure modem 44 to convey signals along data path DP at relatively high data rates without incurring data stall, the Low profile may configure modem 44 to convey signals along data path DP at relatively low data rates while conserving power, and the Medium profile may configure modem 44 to balance data rate with power consumption, for example.

Modem 44 may be dynamically configured to implement a selected one of the DVFM profiles in the set of DVFM profiles at any given time using a DVFM profile selection signal SEL (e.g., a selected one of the High, Medium, or Low DVFM profiles). DVFM profile selection signal SEL may for example, be generated by processors 30 based on data path parameters produced along data path DP and based on one or more thresholds. DVFM profile selection signal SEL may configure modem 44 to implement the selected DVFM profile (e.g., may place modem 44 in an operating state associated with the selected DVFM profile). In other words, DVFM profile selection signal SEL control modem 44 to be powered using the power supply voltage Vi and operated at the frequency fi of the selected DVFM profile. DVFM profile selection signal SEL may for example, control processors 30 to operate using the corresponding frequency fi and may control power supply switching circuitry on modem 44 (e.g., one or more switches that couple one or more power supply rails in device 10 to the circuitry in modem 44) to configure the circuitry on modem 44 to be powered using the corresponding power supply voltage Vi. The load and data rate (speed) used by modem 44 to transmit and/or receive signals at any given moment may be dictated by a network configuration generated by the network (e.g., external wireless equipment 36 such as one or more base stations) and/or software running on device 10 (e.g., one or more software applications that require wireless data transmission and/or reception).

Care should be taken in selection of the DVFM profile used by modem 44 for performing communications at any given time. If the DVFM profile is set unnecessarily high, device 10 will consume excessive power, thereby limiting battery life. On the other hand, if the DVFM profile is set too low, device 10 may be unable to support its current requirements for the successful transmission or reception of wireless data to or from external wireless equipment 36. Modem 44 may therefore include a resource and state manager (RSM) that intelligently and dynamically selects the DVFM profile and thus the power supply voltage Vi and operating frequency fi for modem 44 over time.

Figure 2:
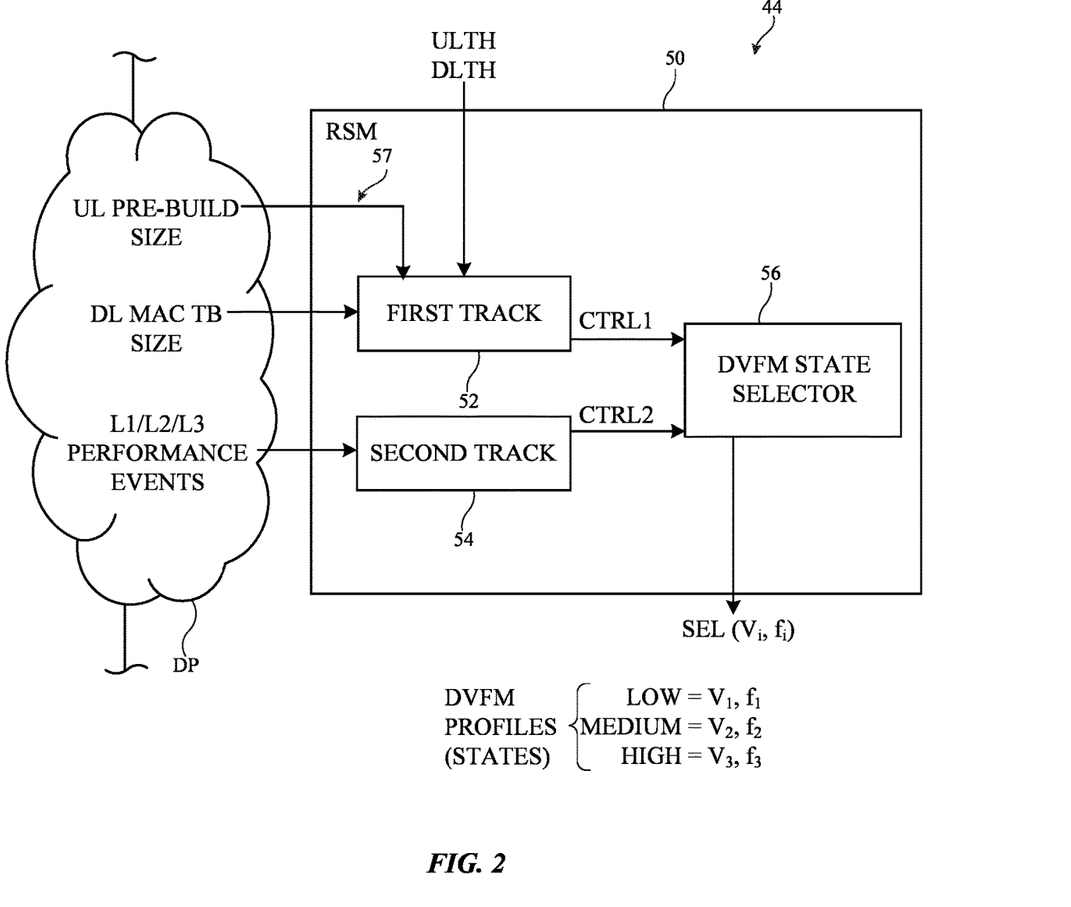
FIG. 2 is a diagram of an illustrative modem having first and second processing tracks for selecting a DVFM profile for wireless communications based on data path parameters in accordance with some embodiments.

FIG. 2 is a diagram showing how modem 44 may include an RSM for selecting a DVFM profile for modem 44 to use in performing wireless communications. As shown in FIG. 2, modem 44 may include a RSM such as RSM 50. The components of RSM 50 may be implemented using hardware (e.g., sets of digital logic gates), firmware, and/or software. As one example, the components of RSM 50 may be implemented using firmware distributed across one or more processors 30 in modem 44.

RSM 50 may be coupled to data path DP over one or more control paths (lines) 57. The circuitry of data path DP may generate data path parameters prior to, during, and/or after conveying signals between baseband 26 and antenna(s) 34. Data path DP may provide the data path parameters to RSM 50 over control paths 57. The data path parameters may include at least an UL pre-build size, a DL media access control (MAC) transport block (TB) size, and information identifying L1, L2, and/or L3 performance events associated with signals conveyed along data path DP UL pre-build size is the predicted UL throughput representing how much data will be processed for UL transmission by modem 44 in the next transmission time interval. DL MAC TB size specifies how many bits the MAC layer will transfer to the physical layer from received DL signals in the next transmission time interval (TTI), and is generally affected by the bandwidth, modulation order/scheme, and resource blocks assigned to device 10 by the network. The information identifying L1/L2/L3 performance events may include information about the L1, L2, and/or L3 performance of data path DP in conveying the signals, for example.

RSM 50 may monitor data path parameters of data path DP and may use the monitored parameters to adjust the current DVFM profile of modem 44. For example, as shown in FIG. 2, RSM 50 may include a first processing track (e.g., a first track of processing circuitry) such as first track 52 and a second processing track (e.g., a second track of processing circuitry) such as second track 54. RSM 50 may also include selection logic such as DVFM profile (state) selector 56. The output of first track 52 and the output of second track 54 may be couple to the input of DVFM state selector 56.

First track 52 may receive UL/DL data path parameters from data path DP such as UL pre-build size and DL MAC TB size. First track 52 may also receive an uplink threshold ULTH and a downlink threshold DLTH. Uplink threshold ULTH and downlink threshold DLTH may be selected based on L1 data path parameters generated by data path DP from scaling tables generated and stored on modem 44 from calibration data generated during initial device configuration of manufacture.

First track 52 (sometimes referred to herein as routine track 52) may generate a control signal CTRL1 based on the UL pre-build size, the DL MAC TB size, the uplink threshold ULTH, and the downlink threshold DLTH. Control signal CTRL1 may identify a first preferred (optimal) DVFM profile for DL signal reception (sometimes referred to herein as a first vote or DL vote). Control signal CTRL1 may also identify a second preferred (optimal) DVFM profile for UL signal transmission (sometimes referred to herein as a second vote or a UL vote). First track 52 may select (e.g., identify, generate, produce, output, calculate, compute, vote for, etc.) the first preferred DVFM profile based on the DL MAC TB size received from data path DP and downlink threshold DLTH. First track 52 may select the second preferred DVFM profile based on the UL pre-build size received from data path DP and uplink threshold ULTH. First track 52 may, for example, select higher DVFM profiles for larger UL pre-build sizes (given the current uplink threshold ULTH) than smaller UL pre-build sizes or for larger DL MAC TB sizes (given the current downlink threshold DLTH) than smaller DL MAC TB sizes. First track 52 may transmit control signal CTRL1 to DVFM state selector 56.

Second track 54 may generate a control signal CTRL2 based on the L1/L2/L3 performance events received from data path DP. Second track 54 may sometimes be referred to herein as protective track 54 (e.g., because second track 54 may protect against selection of a sub-optimal DVFM profile when a performance event occurs that requires a higher DVFM profile than is otherwise required regardless of the UL/DL parameters received from the data path). Control signal CTRL2 may identify a third preferred (optimal) DVFM profile given the L1/L2/L3 performance events along data path DP DL (sometimes referred to herein as a third vote or performance event vote). Second track 54 may select (e.g., identify, generate, produce, output, calculate, compute, vote for, etc.) the third preferred DVFM profile based on the information about the L1/L2/L3 performance events received from data path DP (e.g., regardless of the UL pre-build size or DL MAC TB size). Second track 54 may for example, select higher DVFM profiles when performance events occur or have been detected that are indicative of modem 44 needing higher power supply levels and/or frequencies to successfully transmit or receive wireless data. Second track 54 may transmit control signal CTRL2 to DVFM state selector 56.

DVFM state selector 56 (and thus RSM 50) may select a DVFM profile for modem 44 based on the preferred DVFM profiles identified by control signals CTRL1 and CTRL2. For example, DVFM state selector 56 may aggregate, add, or combine the preferred DVFM profiles (e.g., DVFM profile votes) selected by first track 52 and second track 54. While first track 52 generates the first and second preferred DVFM profiles independently from second track 54 generating the third preferred DVFM profile, aggregating the preferred DVM profiles may serve to optimize efficiency, for example.

DVFM state selector 56 may implement any desired selection logic to select the DVFM profile based on the first and second preferred DVFM profiles (votes) produced by first track 52 and the third preferred DVFM profile (vote) produced by second track 54. As one example, if all three preferred DVFM profiles are the Low DVFM profile, DVFM state selector 56 may select the Low DVFM profile for modem 44. As another example, if one or both of the first and second preferred DVFM profiles are the High DVFM profile, DVFM state selector 56 may select the High DVFM profile for modem 44 regardless of the third preferred DVFM profile. As yet another example, if the third preferred DVFM profile is the High DVFM profile, DVFM state selector 56 may select the High DVFM profile for modem 44 regardless of the first and second preferred DVFM profiles (e.g., selector 56 mayoverride the first and second preferred DVFM profiles in favor of the third preferred DVFM profile). This may for example, allow second track 54 to detect and mitigate potentially critical situations (e.g., L1/L2/L3 performance events) in the circuitry on data path DP by boosting the power profile of modem 44 regardless of the L1/L2 UL/DL data parameters. These examples are illustrative and non-limiting and, in general, any desired selection logic may be used by DVFM state selector 56 to select the DVFM profile for modem 44 based on the UL/DL thresholds and the data path parameters.

DVFM state selector 56 may generate a DVFM profile selection signal SEL that identifies the selected DVFM profile (e.g., a selected one of the Low, Medium, and High DVFM profiles supported by modem 44, where the Low profile corresponds to a power supply voltage of V1 and an operating frequency of f1, the Medium profile corresponds to a power supply voltage of V2>V1 and an operating frequency of f2>f1, and the High profile corresponds to a power supply voltage of V3>V2 and an operating frequency of f3>f2). Modem 44 may have more than three DVFM profiles or only two DVFM profiles if desired. DVFM state selector 56 may then use DVFM profile selection signal SEL to configure modem 44 to implement the selected DVFM profile during subsequent transmission and/or reception of wireless signals.

In this way, modem 44 may support real-time (e.g., at around a 1 ms interval) power adjustments for data path DP in a manner that closely captures the dynamics of data path DP over time (e.g., by selection of a suitable DVFM profile). At the same time, second track 54 may help to prevent potentially critical situations in the circuitry along data path DP (e.g., a full FIFO register, unavailable resources, etc.) from producing unexpected data stalls in the transmitted or received data (e.g., by causing RSM 50 to select a high DVFM profile to mitigate the situation regardless of the preferred DVFM profiles produced by first track 52).

Figure 3:
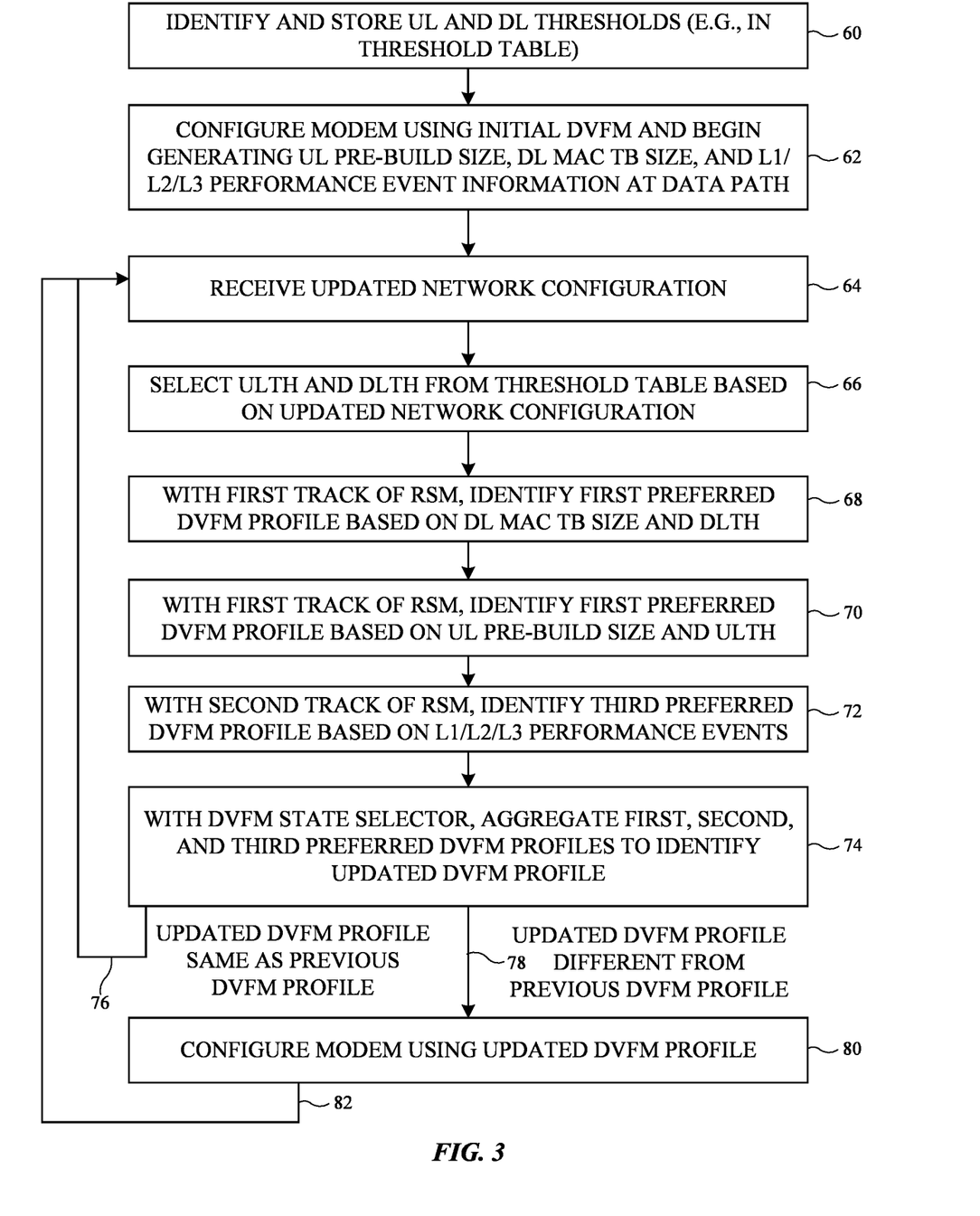
FIG. 3 is a flow chart of illustrative operations that may be performed by an illustrative modem to perform wireless communications using a DVFM profile that is selected based on data path parameters in accordance with some embodiments.

FIG. 3 is a flow chart of illustrative operations that may be performed by modem 44 (e.g., RSM 50 of FIG. 2) to select different DVFM profiles for use in conveying wireless signals over time.

At operation 60, modem 44 may identify and store a set of UL thresholds ULTH and a set of DL thresholds DLTH (e.g., in one or more tables). Different DL thresholds DLTH in the table may for example, specify when different DVFM profiles are to be selected as the first preferred DVFM profile produced by first track 52 under different respective network configurations (e.g., different preferred power adjustments as optimized for UL transmission under for different network configurations). Similarly, different UL thresholds ULTH in the table may specify when different DVFM profiles should be selected as the second preferred DVFM profile produced by first track 52 under different respective network configurations (e.g., different preferred power adjustments as optimized for DL reception under different network configurations).

UL thresholds ULTH and DL thresholds DLTH may be generated once during manufacture, testing, calibration, assembly, and/or initialization of device 10 (e.g., prior to use by an end user). The tables may be stored in static memory, for example. UL thresholds ULTH may for example, represent thresholds of minimum wireless UL performance for different network configurations (e.g., thresholds specifying a minimum power supply voltage Vi and minimum frequency fi that would allow modem 44 to transmit UL signals with satisfactory levels of performance under the corresponding network configuration). Similarly, the DL thresholds DLTH may represent thresholds of minimum wireless DL performance for different network configurations (e.g., thresholds specifying a minimum power supply voltage Vi and minimum frequency fi that would allow modem 44 to receive DL signals with satisfactory levels of performance under the corresponding network configuration).

At operation 62, modem 44 may be configured using an initial DVFM profile (e.g., in an initial DVFM state or at initial power supply voltage and operating frequency settings). Modem 44 may begin conveying wireless signals using the initial DVFM profile. Data path DP may begin to generate data path parameters associated with the conveyed wireless signals. The data path parameters may include UL pre-build size values for upcoming TTIs, DL MAC TB size values for upcoming TTIs, and/or L1/L2/L3 performance events that have occurred, that are occurring, or that are expected to occur in the near future. Data path DP may begin to provide the data path parameters to RSM 50 over control paths 57 (FIG. 2).

At operation 64, device 10 may receive a network configuration update (e.g., information identifying a change in network configuration) from the network (e.g., from a base station). The network configuration update may identify a change in one or more network settings and/or scheduled frequency and/or time resources for device 10 to use in communicating with the network during an upcoming interval (e.g., as assigned to device 10 by the network). As a few examples, the network configuration update can include a subscriber identity module (SIM) identifier (e.g., identifying a SIM on device 10 to use for communications), a RAT identifier (e.g., identifying whether device 10 is to communicate using LTE or 5G NR), a numerology identifier (e.g., identifying the numerology or subcarrier spacing to be used for communications, such as 15 kHz, 30 kHz, 60 kHz, 120 kHz, 240 kHz, etc.), a cell type or carrier aggregation configuration identifier (e.g., identifying whether communications are to be performed over a primary cell (PCELL) or secondary cell (SCELL) under a carrier aggregation (CA) scheme, PSCELL, NCELL, etc.), etc.

At operation 66, first track 52 of RSM 50 may select the particular uplink threshold value ULTH and the particular downlink threshold value DLTH corresponding to the updated network configuration (e.g., from the stored tables as generated at operation 60). Operation 66 may be performed concurrently with operation 68.

At operation 68, first track 52 of RSM 50 may identify (e.g., select, compute, calculate, determine, produce, output, vote for, etc.) the first preferred DVFM profile for modem 44 based on the selected downlink threshold value DLTH and the DL MAC TB size received from data path DP. First track 52 may periodically generate the first preferred DVFM profile if desired (e.g., during every 1 ms cycle). The first preferred DVFM profile may for example, be the profile that would accommodate the DL MAC TB size for the next TTI given the selected downlink threshold value DLTH associated with the current (updated) network configuration (e.g., where higher DL MAC TB sizes generally require a higher DVFM profile for DL reception to exhibit a satisfactory level of performance).

At operation 70, first track 52 of RSM 50 may identify the second preferred DVFM profile for modem 44 based on the selected uplink threshold value ULTH and the UL pre-build size received from data path DP. First track 52 may periodically generate the second preferred DVFM profile if desired (e.g., during every 1 ms cycle). The second preferred DVFM profile may for example, be the profile that would accommodate the UL pre-build size for the next TTI given the selected uplink threshold value ULTH associated with the current (updated) network configuration (e.g., where higher UL pre-build sizes generally require a higher DVFM profile for UL transmission to exhibit a satisfactory level of performance).

At operation 72, second track 54 of RSM 50 may identify the third preferred DVFM profile for modem 44 based on L1/L2/L3 performance events received from data path DP (if any have occurred). If no performance events have occurred, second track 54 may select a default DVFM as the third preferred DVFM (e.g., the Low DVFM profile to help conserve power). A performance event may occur when a specific resource in data path DP has entered or exited a critical situation (e.g., a situation which, if left unmitigated during at least the next interval, would lead to a deterioration in wireless performance by more than a threshold amount), such as when a first-in first-out (FIFO) register in data path DP has become full or a hardware resource in data path DP has become unavailable. The third preferred DVFM profile may for example, be the profile that would allow modem 44 to continue to exhibit wireless performance exceeding a threshold level of performance during at least the next interval, despite the presence/occurrence of the performance event. In this way, RSM 50 may account for unexpected situations that might arise while conveying wireless data that is not otherwise covered by first track 52. Second track 54 may perform operation 72 independently from and concurrently with operations 68 and 70 performed by first track 52.

At operation 74, DVFM state selector 56 may aggregate (e.g., combine, add, etc.) the first, second, and third preferred DVFM profiles to identify (select) an updated DVFM profile for use by modem 44 during the next interval. DVFM state selector 56 may implement any desired selection logic to select the DVFM profile from the set of DVFM profiles that matches the most of the requirements of data path DP as indicated by the first, second, and third preferred DVFM profiles, or that otherwise optimizes the performance of data path DP given the first, second, and third preferred DVFM profiles. Put differently, selector 56 may elect the updated DVFM profile based on the votes of first track 52 and second track 54. If desired, DVFM state selector 56 may aggregate the preferred DVFM profiles using a bitmap method to further improve performance. The aggregation may serve to reduce excessive or unnecessary adjustments to the DVFM profile of modem 44 over time, each of which brings additional energy and performance cost. If desired, when two or three (or a majority) of the preferred DVFM profiles are the same DVFM profile, DVFM state selector may select that DVFM profile as the updated DVFM profile. As another example, DVFM state selector may select the highest of the first, second, and third preferred DVFM profile as the updated DVFM profile. This may for example, help to ensure that modem 44 exhibits satisfactory levels of performance even if a majority of the preferred DVFM profiles are lower than the selected DVFM profile. In general, selector 56 may implement any desired profile selection logic.

If the updated DVFM profile selected by DVFM state selector 56 is the same as the current DVFM profile, the DVFM profile of modem 44 need not be adjusted and processing may loop back to operation 64 via path 76 as the network configuration changes. If the updated DVFM profile selected by DVFM state selector 56 is the different from the current DVFM profile, DVFM state selector 56 may generate a DVFM profile selection signal SEL that identifies the updated DVFM profile and processing may proceed from operation 74 to operation 80 via path 78.

At operation 80, modem 44 may be configured according to the selected (updated) DVFM profile (e.g., based on DVFM profile selection signal SEL). In other words, modem 44 may be placed into the power and frequency state specified by the selected DVFM profile. Processors 30 may be configured to operate at the frequency fi of the selected DVFM profile during the next interval. The components of modem 44 may be powered using the power supply voltage Vi of the selected DVFM profile during the next interval. Processing may then loop back to operation 64 via path 82 as the network configuration changes.

Figure 4:
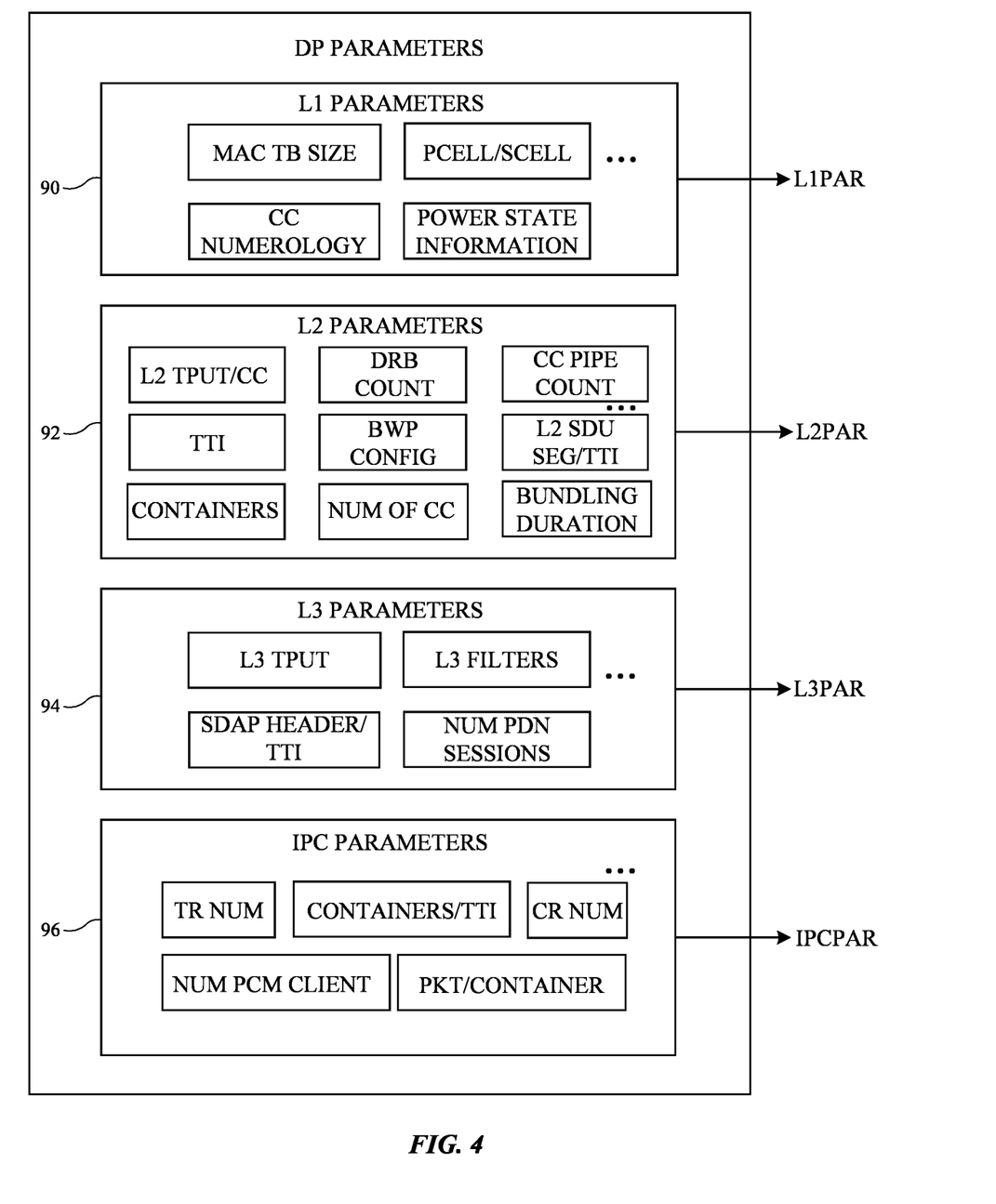
FIG. 4 is a diagram of illustrative data path parameters that may be used by a modem in selecting a DVFM profile for wireless communications in accordance with some embodiments.

FIG. 4 is a diagram of exemplary data path parameters that may be generated by data path DP and that may be processed by RSM 50 in selecting a DVFM profile for use during an upcoming interval. As shown in FIG. 4, data path DP may generate L1 parameters 90, L2 parameters 92, L3 parameters 94, and/or IPC parameters 96. Data path DP may generate a first control signal L1PAR that identifies one or more of the generated L1 parameters, may generate a second control signal L2PAR that identifies one or more of the generated L2 parameters, may generate a third control signal L3PAR that identifies one or more of the generated L3 parameters, and may generate a fourth control signal IPCPAR that identifies one or more of the generated IPC parameters. RSM 50 may receive control signals L1PAR, L2PAR, L3PAR, and/or IPCPAR over control paths 57 (FIG. 2). For example, first track 52 may generate control signal CTRL1 (FIG. 2) based on data path parameters specified within control signals L1PAR and L2PAR, whereas second track 54 generates control signal CTRL2 based on data path parameters specified within control signals L3PAR and IPCPAR.

As shown in FIG. 4, L1 parameters 90 may include MAC TB size (e.g., DL MAC TB size), PSCELL/SCELL information, component carrier (CC) numerology, power state information (e.g., per-RAT or per-SIM), and/or any other desired L1 parameters. L2 parameters 92 may include L2 throughput (TPUT) information (e.g., per-CC) such as UL pre-build size, data radio bearer (DRB) count information, CC pipe count information, information identifying the TTI, a bandwidth part (BWP) configuration for modem 44 (e.g., a list of one or more BWPs of one or more CCs for use in performing communications), information identifying L2 service data unit (SDU) segments per TTI, container information, bundling duration information, CC numerology information, and/or any other desired L2 parameters.

L3 parameters 94 may include L3 TPUT information, L3 filter information, service data adaption protocol (SDAP) header information (per TTI), information on a number of PDN sessions, and/or any other desired L3 parameters. IPC parameters 96 may include information identifying a TR NUM, containers per TTI, a CR NUM, a NUM PCM client, the number of packets per container, and/or any other desired IPC parameters.

Figure 5:
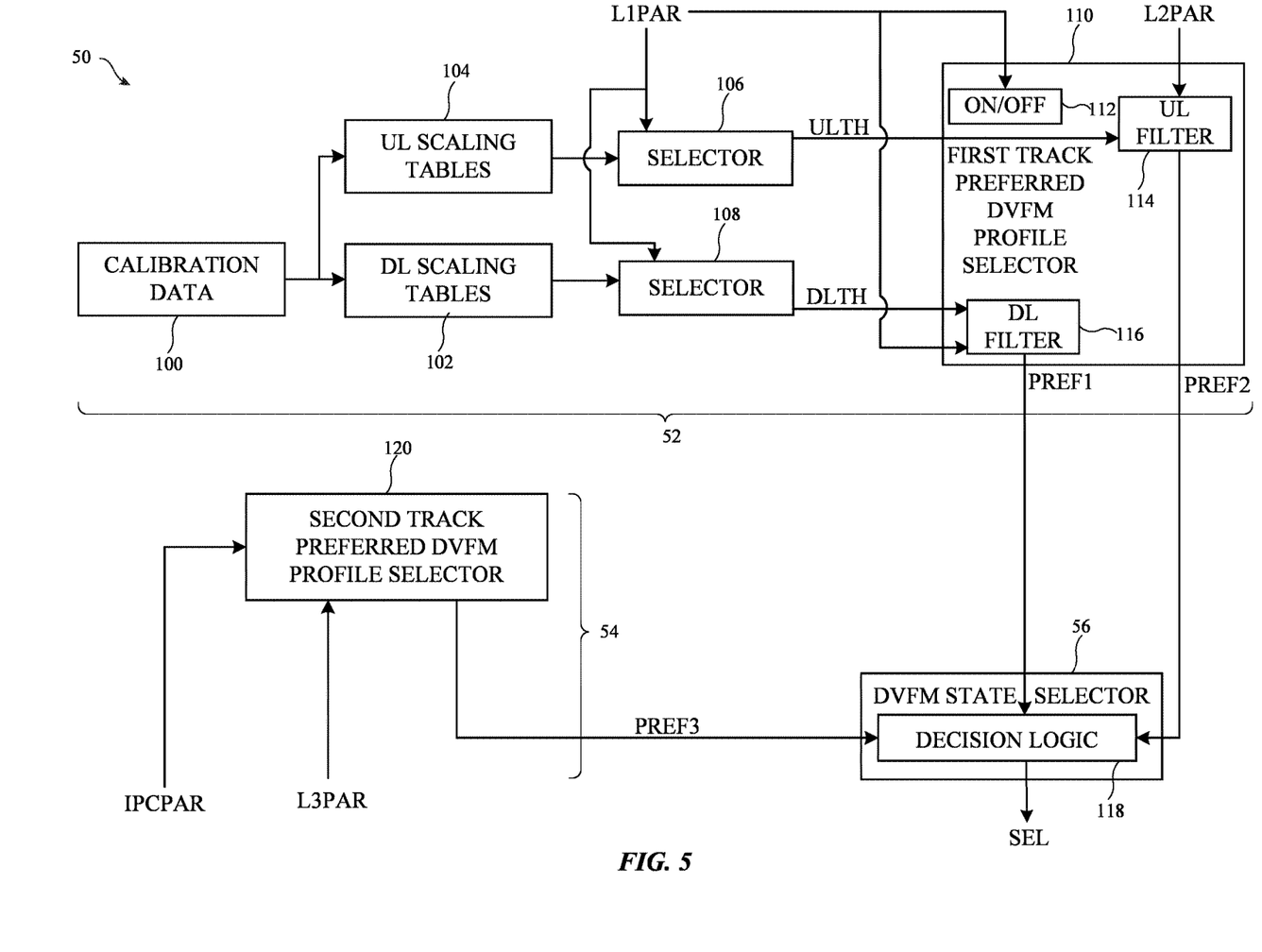
FIG. 5 is a diagram of illustrative circuitry in a modem having first and second processing tracks for selecting a DVFM profile in accordance with some embodiments.

FIG. 5 is a diagram showing one exemplary implementation for first track 52 and second track 54 of RSM 50 (FIG. 2). As shown in FIG. 5, first track 52 may include calibration data 100, UL scaling tables 104, DL scaling tables 102, selectors 106 and 108, and first track preferred DVFM profile selector 110. Second track 54 may include second track preferred DVFM profile selector 120.

Calibration data 100 may include power profile results as generated during initialization or calibration of device 10 (e.g., while processing operation 60 of FIG. 3). Calibration data 100 may be stored in UL scaling table 104 (e.g., a table of uplink thresholds ULTH for different network configurations) and DL scaling table 102 (e.g., a table of downlink thresholds DLTH for different network configurations). Selectors 106 and 108 may receive L1 parameters in control signal L1PAR from data path DP.

Selector 106 may select the uplink threshold ULTH from UL scaling table 104 corresponding to the current network configuration based on the L1 parameters in control signal L1PAR (e.g., based on the SIM, RAT, numerology, and/or CC configurations specified in the updated network configuration received at operation 64 of FIG. 3 and included in the L1 parameters in control signal L1PAR). Similarly, selector 108 may select the downlink threshold DLTH from DL scaling table 102 corresponding to the current network configuration based on the L1 parameters in control signal L1PAR (e.g., based on the SIM, RAT, numerology, and/or CC configurations specified in the updated network configuration received at operation 64 of FIG. 3 and included in the L1 parameters in control signal L1PAR). These selections may occur while processing operation 66 of FIG. 3, for example.

First track preferred DVFM profile selector 110 may include a UL filter 114, a DL filter 116, and activation circuitry 112. Selector 106 may pass the current uplink threshold value ULTH to UL filter 114. Selector 108 may pass the current downlink threshold value DLTH to DL filter 116. Activation circuitry 112 may receive L1 parameters in control signal L1PAR such as information identifying a power state of data path DP. Activation circuitry 112 may activate (e.g., enable or power) first track preferred DVFM profile selector 110 when data path DP is powered on or actively conveying signals and may otherwise power off first track preferred DVFM profile selector 110 to conserve power, for example.

DL filter 116 may generate the first preferred DVFM profile PREF1 based on the current downlink threshold value DLTH and L1 parameters from control signal L1PAR (e.g., a MAC DL TB size or running sum in the L1 parameters). DL filter 116 may generate the first preferred DVFM profile PREF1 while processing operation 68 of FIG. 3, for example. UL filter 114 may generate the second preferred DVFM profile PREF2 based on the current uplink threshold value ULTH and L2 parameters from control signal L2PAR (e.g., a UL pre-build size per SIM in the L2 parameters). UL filter 114 may generate the second preferred DVFM profile PREF2 while processing operation 70 of FIG. 3, for example. First track preferred DVFM profile selector 110 may transmit first preferred DVFM profile PREF1 and second preferred DVFM profile PREF2 to decision logic 118 in DVFM state selector 56 (e.g., as control signal CTRL1 of FIG. 2). Filters 114 and 116 may help to prevent short bursts of parameters from unnecessarily changing the DVFM profile of modem 44.

Second track preferred DVFM profile selector 120 may receive L3 parameters via control signal L3PAR and IPC parameters via control signal IPCPAR. Second track preferred DVFM profile selector 120 may generate the third preferred DVFM profile PREF3 based on the L3 parameters from control signal L3PAR (e.g., a flag, alter, message, or signal identifying that a FIFO register in the data path has become full or that a hardware resource has become exhausted) and/or based on the IPC parameters from control signal IPCPAR (e.g., a flag indicating that a peripheral component interconnect express (PCIe) link from the AP to modem 44 has become unavailable, etc.). As one example, when the L3 parameters indicate a PTM FIFO register is full, selector 120 may check if boosting the power supply of data path DP can solve the situation. If the situation can be solved, third preferred DVFM profile PREF3 can be set to the High DVFM profile, otherwise selector 120 may vote for a lower profile. Second track preferred DVFM profile selector 120 may transmit third preferred DVFM profile PREF3 to decision logic 118 in DVFM state selector 56 (e.g., as control signal CTRL2 of FIG. 2).

Decision logic 118 may aggregate preferred DVFM profiles PREF1, PREF2, and PREF3, may select an updated DVFM profile for modem 44 based on the aggregated preferred DVFM profiles PREF1, PREF2, and PREF3 (e.g., while processing operation 74 of FIG. 3). Decision logic 118 may generate a DVFM profile selection signal SEL that identifies the selected DVFM profile for modem 44. The example of FIG. 5 is illustrative and non-limiting. In general, RSM 50 may be implemented using other architectures.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-5 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A method of operating an electronic device, the method comprising:
    transmitting wireless data using a modem communicatively coupled to one or more antennas; and
    adjusting a power supply voltage of the modem based on an uplink (UL) pre-build size of the wireless data.

2. The method of claim 1, further comprising:
    adjusting an operating frequency of a processor of the modem based on the UL pre-build size of the wireless data.

3. The method of claim 1, further comprising:
    receiving additional wireless data using the modem; and
    adjusting the power supply voltage based on a downlink (DL) media access control (MAC) transport block (TB) size of the additional wireless data.

4. The method of claim 3, wherein transmitting the wireless data includes transmitting the wireless data over a data path of the modem, the method further comprising:
    adjusting the power supply voltage based on a Layer 3 (L3) parameter of the data path.

5. The method of claim 4, wherein the L3 parameter comprises a parameter indicative of a hardware resource of the data path becoming unavailable.

6. The method of claim 5, wherein the L3 parameter comprises an indication that a first in first out (FIFO) register of the data path has become full.

7. The method of claim 4, further comprising:
    identifying a first preferred power supply voltage based on the DL MAC TB size of the additional wireless data;
    identifying a second preferred power supply voltage based on the UL pre-build size of the wireless data;
    identifying a third preferred power supply voltage based on the L3 parameter of the data path; and
    adjusting the power supply voltage based on an aggregation of the first, second, and third preferred power supply voltages.

8. The method of claim 3, further comprising:
    adjusting the power supply voltage based on an inter-processor communication (IPC) parameter associated with communication between the modem and an application processor (AP) of the electronic device.

9. The method of claim 1, further comprising:
    receiving a network configuration from a wireless base station; and
    adjusting the power supply voltage based on a threshold stored on the electronic device, the threshold being selected based on the network configuration.

10. The method of claim 9, wherein the network configuration comprises a subscriber identity module (SIM) identifier, a radio access technology (RAT) identifier, a numerology identifier, or a carrier aggregation configuration identifier.

11. A method of operating an electronic device, the method comprising:
    receiving wireless data using a data path of a modem communicatively coupled to one or more antennas; and
    adjusting a power supply voltage of the modem based on a Layer 3 (L3) parameter of the data path associated with receiving the wireless data.

12. The method of claim 11, further comprising:
    adjusting an operating frequency of a processor of the modem based on the L3 parameter.

13. The method of claim 11, wherein the L3 parameter comprises a parameter indicative of a hardware resource of the data path becoming unavailable.

14. The method of claim 11, wherein the L3 parameter comprises an indication of a first in first out (FIFO) register of the data path becoming full.

15. The method of claim 11, further comprising:
    transmitting additional wireless data using the modem; and
    adjusting the power supply voltage based on an uplink (UL) pre-build size of the additional wireless data.

16. The method of claim 15, further comprising:
    identifying a first preferred power supply voltage based on the UL pre-build size;
    identifying a second preferred power supply voltage based on the L3 parameter; and
    adjusting the power supply voltage based on an aggregation of the first and second preferred power supply voltages.

17. The method of claim 16, wherein adjusting the power supply voltage based on the aggregation of the first and second preferred power supply voltages comprises:
    supplying the modem with the second preferred power supply voltage when the second preferred power supply voltage is higher than the first preferred power supply voltage.

18. The method of claim 11, further comprising:
    adjusting the power supply voltage based on an inter-processor communication (IPC) parameter associated with communication between the modem and an application processor (AP) of the electronic device.

19. An electronic device comprising:
    one or more antennas;
    a modem communicatively coupled to the one or more antennas and configured to convey radio-frequency signals using a power supply voltage and an operating frequency; and one or more processors configured to interface with the modem over a link characterized by an inter-processor communication (IPC) parameter, the modem being configured to adjust the power supply voltage and the operating frequency based on the IPC parameter.

20. The electronic device of claim 19, wherein the modem is configured to increase the power supply voltage and the operating frequency when the IPC parameter is indicative of depletion of a hardware resource along the data path.

* * * * *